United States Patent
Lai

(10) Patent No.: US 7,491,074 B1
(45) Date of Patent: Feb. 17, 2009

(54) CARD CONNECTOR

(75) Inventor: Yaw-Huey Lai, Taipei County (TW)

(73) Assignee: Tai-Sol Electronics Co., Ltd., Taipei (TW)

( * ) Notice: Subject to any disclaimer, the term of this patent is extended or adjusted under 35 U.S.C. 154(b) by 0 days.

(21) Appl. No.: 12/071,825

(22) Filed: Feb. 27, 2008

(30) Foreign Application Priority Data

Aug. 29, 2007 (TW) .............................. 96214411 U

(51) Int. Cl.
*H01R 13/62* (2006.01)
(52) U.S. Cl. ..................................................... 439/159
(58) Field of Classification Search ................. 439/325, 439/327, 155, 159
See application file for complete search history.

(56) References Cited

U.S. PATENT DOCUMENTS

| 6,394,827 | B2 * | 5/2002 | Nogami | 439/159 |
| 6,802,726 | B2 * | 10/2004 | Chang | 439/159 |
| 7,083,446 | B2 * | 8/2006 | Tanaka et al. | 439/159 |
| 2004/0009691 | A1 * | 1/2004 | Chang | 439/159 |

FOREIGN PATENT DOCUMENTS

| CN | 2405337 | 11/2000 |
| CN | 1692531 | 11/2005 |
| CN | 2746600 | 12/2005 |
| CN | 1755990 | 4/2006 |

* cited by examiner

*Primary Examiner*—Phuong K Dinh
(74) *Attorney, Agent, or Firm*—Bacon & Thomas, PLLC

(57) ABSTRACT

A card connector includes a housing, a base, a slidable member, three of which are provided in the base and define a receiving chamber for receiving a memory card thereamong, and a spring. A tongue is provided on a sidewall of the housing. The memory card has a locating recess formed at one side thereof corresponding to the tongue. The slidable member includes a recession formed on a sidewall thereof corresponding to the tongue, and an opening cut through the sidewall and in communication with the recession. A hooked member is provided in the recession. The recession is provided with a first matching portion, and the hooked member has a second matching portion for joint with the first matching portion. Therefore, the card connector is structurally simple, of secure locking, and can effectively engage and prevent an electronic card inserted therein from falling-off.

10 Claims, 11 Drawing Sheets

CARD CONNECTOR

BACKGROUND OF THE INVENTION

1. Field of the Invention

The present invention relates generally to connectors, and more particularly, to an electronic card connector.

2. Description of the Related Art

A currently available card connector includes means for locking a memory card inserted into the card connector to secure the memory card in stable connection with the card connector, and there are a variety of such means for locking the memory card. For example, China Patent Publication No. 2405337 disclosed an electronic card connector having a locking device, which is composed of an insulative housing having at least one slot, a plurality of contacts received within the insulative housing, an elongated spring bar mounted in the elongated slot and having a protrusion, and a metallic spring buffer disposed inside the elongated slot and having a spring arm portion, which pressingly engages the spring bar at a first supporting section thereof, a tail portion abutting against a side wall formed adjacent to the elongated slot, and a bight portion formed between the spring arm portion and the tail portion. As disclosed in China Patent Publication No. 2746600, an electronic card connector is composed of an insulating frame having a plurality of electric contacts, an ejecting mechanism mounted to the insulating housing for guiding insertion and ejection of an electronic card, and a shield having a stopping piece for covering the external periphery of the insulating housing, wherein the ejecting mechanism includes a locking member having an assembly arm and a locking arm, which are connected with and spaced from each other for a predetermined distance, the assembly arm being mounted to a slide bar of the ejecting mechanism, the locking arm being movable with respect to the assembly arm; during insertion of an electronic card, the card is moved along the slide bar and the locking arm is moved to stop against the shield piece so as to fail to move with respect to the assembly arm, thus forcing the locking arm stopping against one side of the card to lock the card in position. As disclosed in China Patent Publication No. 1755990, a connector for a memory card includes a housing composed of a frame and a sealing plate covering the frame, a slider slidably mounted in the frame, a return spring provided for biasing the slider in the direction of card ejection, a half-lock spring fixed to the slider and having an engaging projection engaged to a recess of the card for half locking the card, and an inclined rib mounted to an inner sidewall of the housing for preventing the popping-out of the memory card 3 by the return spring when the card is ejected; while the card is being ejected, the inclined rib is stopped against the half-lock spring to refrain the half-lock spring from deformation, thus preventing the card from popping-out while the return spring is reset. Further, China Patent Publication No. 1692531 disclosed a card connector composed of a box-shaped housing having a card insertion opening formed in a front portion thereof through which a memory card is inserted; a contact block mounted in the vicinity of a rear end thereof and in an inside of the housing and holding an alignment of a plurality of contacts which are to be contacted with I/O contacting terminals of the memory card in a manner so that contacting portions of the contacts are protruded toward the card insertion opening; a slider mounted between the contact block and the card insertion opening in the inside of the housing and slidable in a cross direction of the housing, having a contacting portion for contacting with a front end of the memory card inserted into the housing from the card insertion opening and a plurality of arm portions thereof for guiding side edges of the memory card, and sliding with the memory card corresponding to a movement of the memory card; a spring provided in the inside of the housing and constantly applying pressure to the slider toward the card insertion opening; a heart-shaped cam groove unit formed in the inside of the housing and having a heart-shaped cam and a guide groove located around the heart-shaped cam; a locking member having a guide pin provided at an end thereof in a longitudinal direction and engaged with and slidable along the guide groove of the heart-shaped cam groove unit and a rotation shaft thereof provided at the other end thereof and rotatably borne by a bearing provided on a side portion of the slider, rotating around the rotation shaft owing to a movement of the guide pin along the guide groove corresponding to a movement of the slider in the cross direction, and locking the movement of the slider at a predetermined position by fitting the guide pin into a recess provided at a predetermined position on the heart-shaped cam when a pressing force applied to the memory card is released after moving the slider to an aftermost position in the cross direction of the housing; and a locking protrusion provided at an intermediate portion of the locking member in the cross direction of the housing, and engaging with a recess used to be locked provided on the memory card by protruding toward the memory card corresponding to the rotation of the locking member at the predetermined position where the movement of the slider is locked.

As stated above, the currently available locking mechanisms are structurally complex to need improvement.

SUMMARY OF THE INVENTION

The primary objective of the present invention is to provide a card connector, which provides a new locking mechanism that is structurally simple, of secure locking, and can effectively engage and prevent an electronic card inserted therein from falling-off.

The foregoing objective of the present invention is attained by the card connector composed of a housing, a base, a plurality of terminals, a slidable member, and a spring. The terminals are provided in the base. The spring, the slidable member, and the base are provided in the housing. The housing, the base, and the slidable member define a receiving chamber for receiving a memory card thereamong. The base is located at a rear end of the receiving chamber. The slidable member is movable for reciprocation within the receiving chamber. A tongue is provided on a sidewall of the housing. The memory card has a locating recess formed at one side thereof corresponding to the tongue. The slidable member includes a recession formed on a sidewall thereof corresponding to the tongue, and an opening cut through the sidewall and in communication with the recession. A hooked member is provided in the recession. The recession is provided with a first matching portion, and the hooked member has a second matching portion for joint with the first matching portion. While the memory card is pushed to drive the slidable member to move toward the base, the tongue forces the hooked member to act in the recession. While the memory card is inserted into the card connector, the hooked member dips through the opening of the slidable member into the locating recess of the memory card.

DETAILED DESCRIPTION OF PREFERRED EMBODIMENTS

Figure 1:
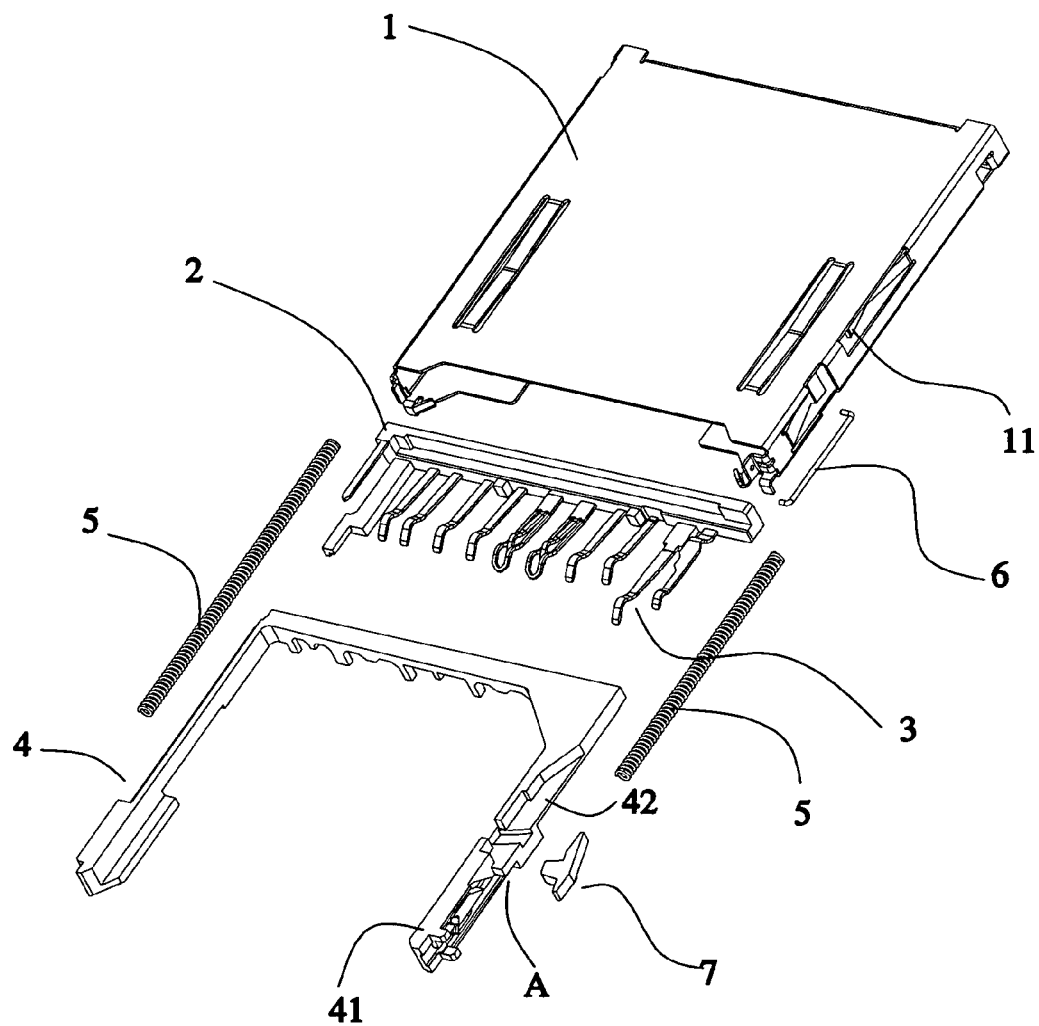
FIG. 1 is an exploded view of a first preferred embodiment of the present invention.
Figure 2:
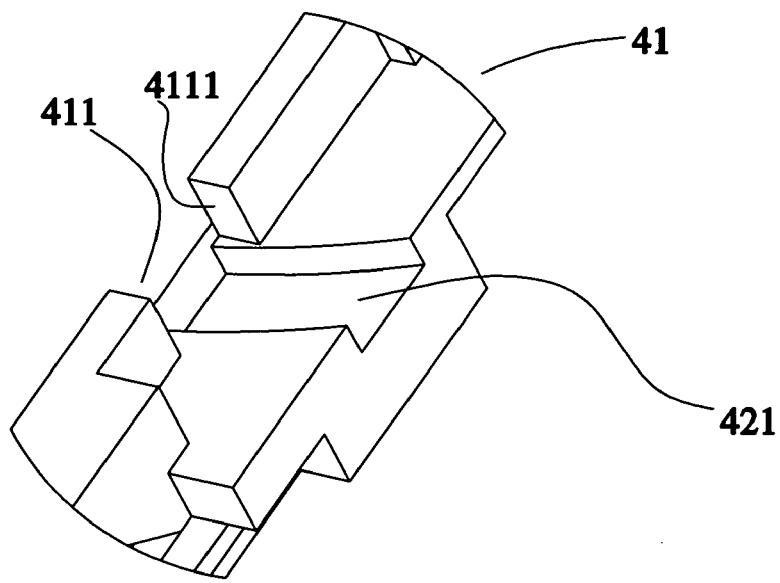
FIG. 2 is an enlarged view of a part A indicated in FIG. 1.
Figure 3:
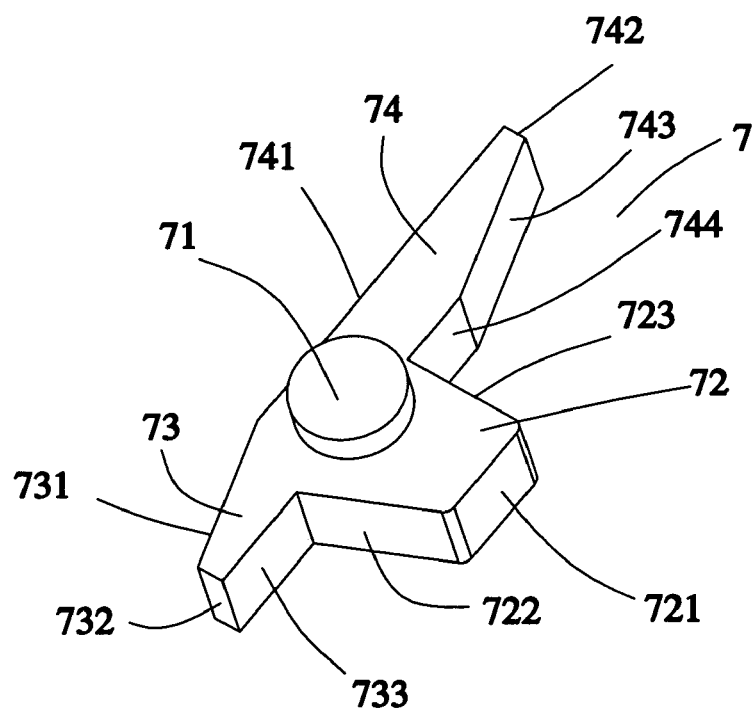
FIG. 3 is an enlarged view of the hooked member in accordance with the first preferred embodiment of the present invention.

Referring to FIGS. 1-3, a card connector constructed according to a first embodiment of the present invention is composed of a housing 1, a base 2, a plurality of terminals 3, a slidable member 4, a spring 5, a guiding bar 6, and a hooked member 7. The housing 1 includes a tongue 11 provided on a sidewall thereof and having a front arm 111, a rear arm 112, and a bended portion provided between the front and rear arms 111 and 112. The terminals 3 are mounted in the base 2. The spring 5, the slidable member 4, and the base 2 are mounted in the housing 1. The housing 1, the base 2, and the slidable member 4 define a receiving chamber thereamong for receiving a memory card having a locating recess. The slidable member 4 includes a sidewall 41, a recession 42 formed on the sidewall 41 and close to an external side thereof, an opening 411 formed on an internal side of the sidewall 41, an end face 4111 provided on the sidewall 41 and abutting the opening 411, and a groove 421 provided in the recession 42 and defined as a first matching portion and connected with the opening 411. The hooked member 7, as shown in FIG. 3, includes a head portion 72, a first arm 73, and a second arm 74, three of which are formed in one piece. A column-shaped convex portion 71 protrudes upward from a junction of the head portion 72, the first arm 73, and the second arm 74. The head portion 72 has a top 721 provided on a lateral fringe thereof for matching a bottom side of the locating recess of the memory card while the memory card is locked; a first lateral side 722 thereof provided for matching a rear side of the locating recess of the memory card while the memory card is pushed inward; and a second lateral side thereof 723 provided for matching a front side of the locating recess while the memory card is locked. The first arm 73 at a lateral fringe thereof has a first bottom side 731, a first end face 732, and a first shoulder portion 733. The second arm 74 at a lateral fringe thereof has a bottom side 741, a second end face 742, a second shoulder portion 743, and a third shoulder portion 744 for matching the second lateral side 723 of the head portion 72. The hooked member 7 is mounted in the recession 42, the convex portion 71 located in the groove 421, and is movable and rotatable in the groove 421 on the convex portion 71. The head portion 72 of the hooked member 7 can dip through the opening 411 into the receiving chamber to match the slidable member and the locating recess of the memory card, further locking the memory card in the receiving chamber.

In addition to FIGS. 1-3 illustrating the process of insertion of the memory card into the card connector having the hooked member 7 and the recession 42 in accordance to the first preferred embodiment of the present invention, FIGS. 4-10 provide the following further detailed illustration of the insertion of the memory card.

Figure 4:
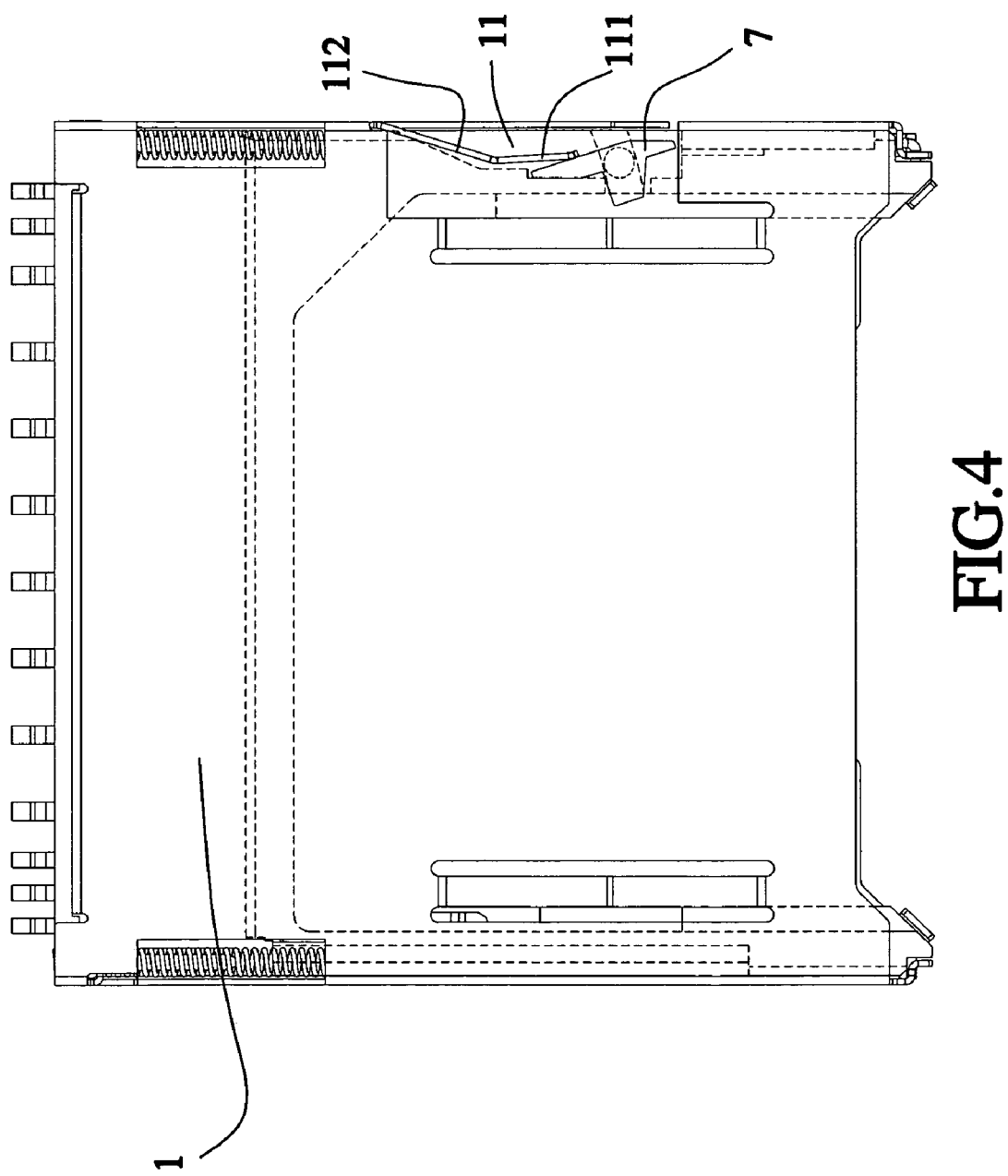
FIG. 4 is a schematic view of the first preferred embodiment of the present invention in combination with a memory card, illustrating that the memory card has not been inserted into the card connector.

1. Referring to FIG. 4, before the memory card is inserted into the card connector, where the tongue 11 is stopped against the hooked member 7 is located at the front portion 111 of the tongue 11 and the second bottom side 741 of the second arm 74. In the meantime, the second should portion 743 matches the recession 42, the top 721 of the head portion 72 dips into the opening 411 of the sidewall 41, and the lateral side 723 of the head portion 72 matches the end face 4111 of the opening 411.

Figure 5:
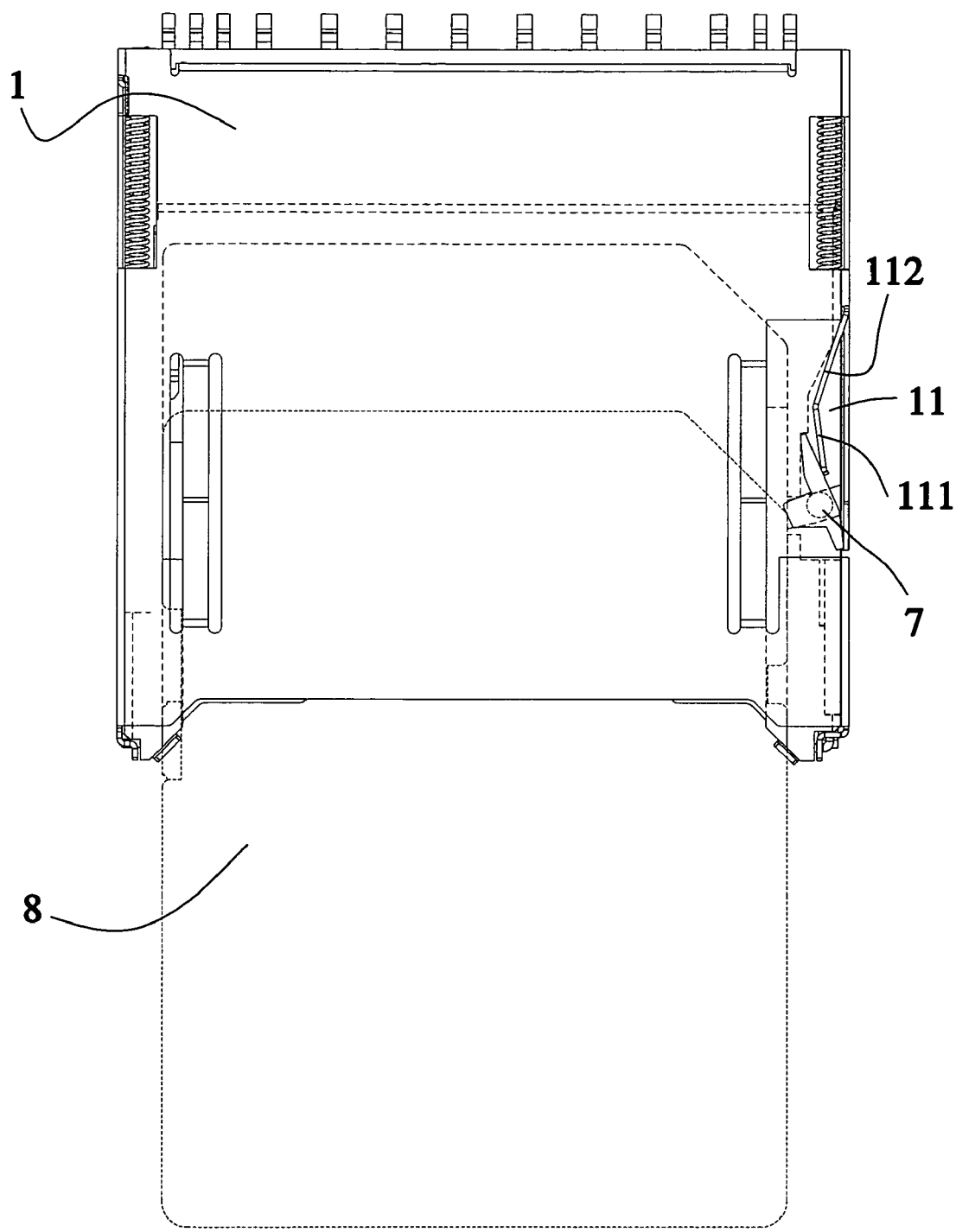
FIG. 5 is similar to FIG. 4, illustrating that the memory card is located at the initial position of the insertion.

2. Referring to FIG. 5, while a memory card 8 having a bevel is initially inserted into the card connector, the bevel of the memory card contacts the hooked member and the card 8 forces the hooked member 7 to turn outward. In the meantime, the top 721 of the head portion 72 is stopped against the bevel of the card 8, the third shoulder portion 744 of the second arm 74, under the squeeze of the card 8, departs from the recession 42, and the first bottom side of the first arm 73 is stopped against one side of the housing 1.

Figure 6:
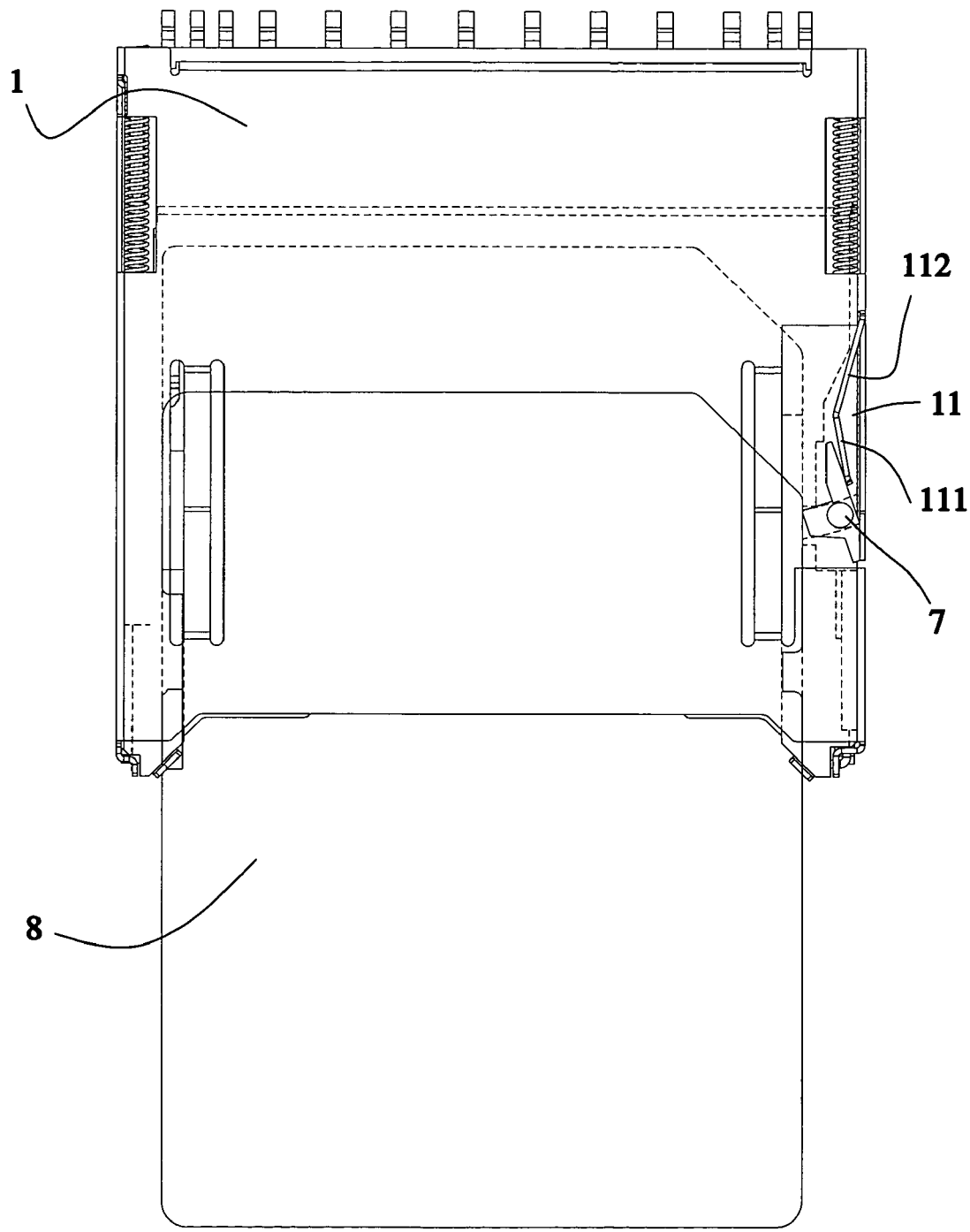
FIG. 6 is similar to FIG. 4, illustrating that the memory card is inserted to let its one side contact the hooked member.

3. Referring to FIG. 6, while the card 8 is inserted, one side of the card 8 contacts the hooked member 7.

Figure 7:
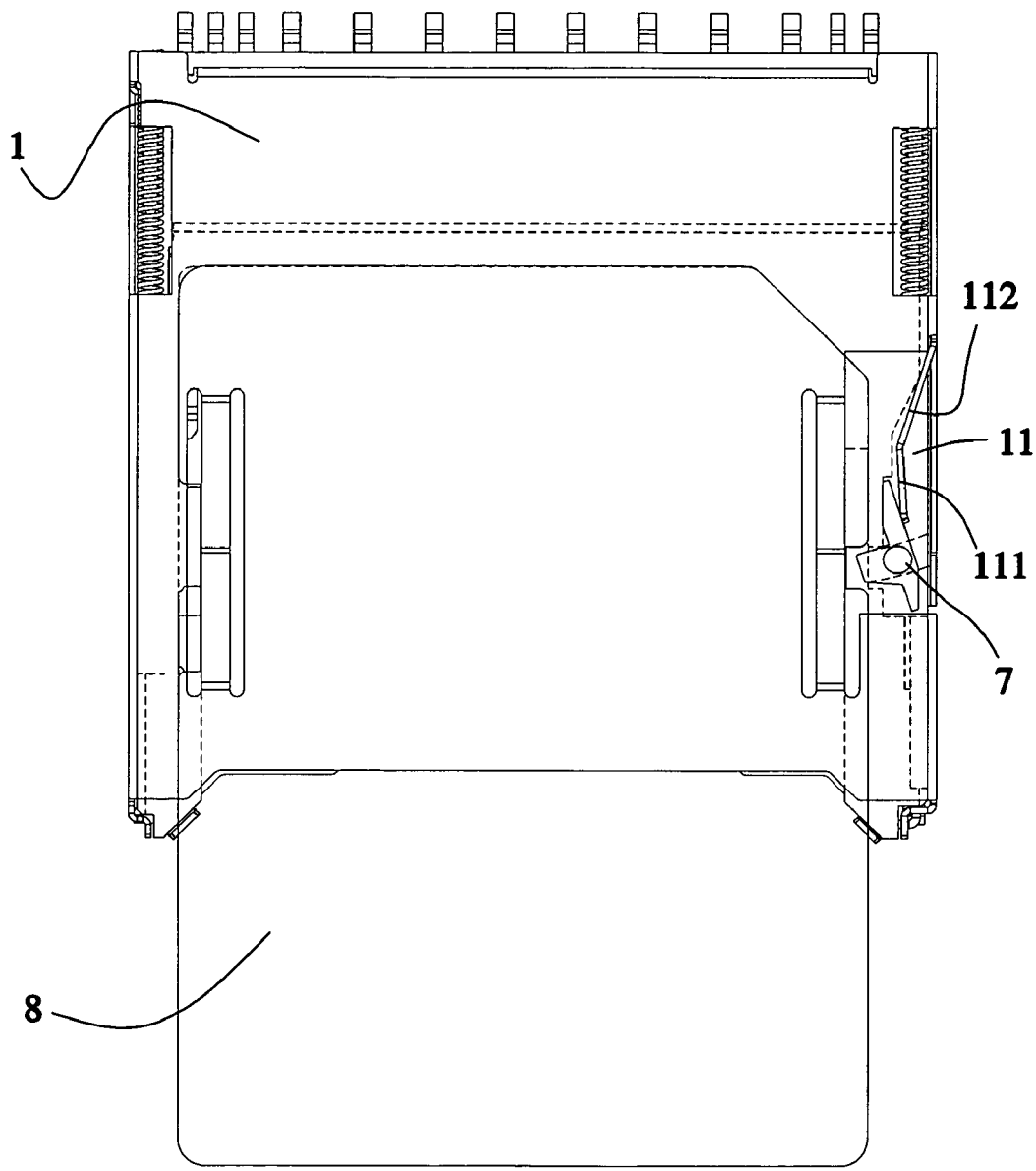
FIG. 7 is similar to FIG. 6, illustrating that the memory card is inserted to where the hooked member is engaged with the locating recess of the memory card.

4. Referring to FIG. 7, while the card 8 is inserted into where the locating recess abuts the hooked member 7, where the hooked member 7 is stopped against the tongue 11 is the same as in FIG. 6, but the one side of the card 8 is no longer stopped against the hooked member 7. Thus, the hooked member 7 can be turned toward the locating recess of the card 8, the head portion 72 of the hooked member 7 dips into the locating recess, and the first bottom side 731 of the first arm 73 is no longer stopped against the one side of the housing 1.

Figure 8:
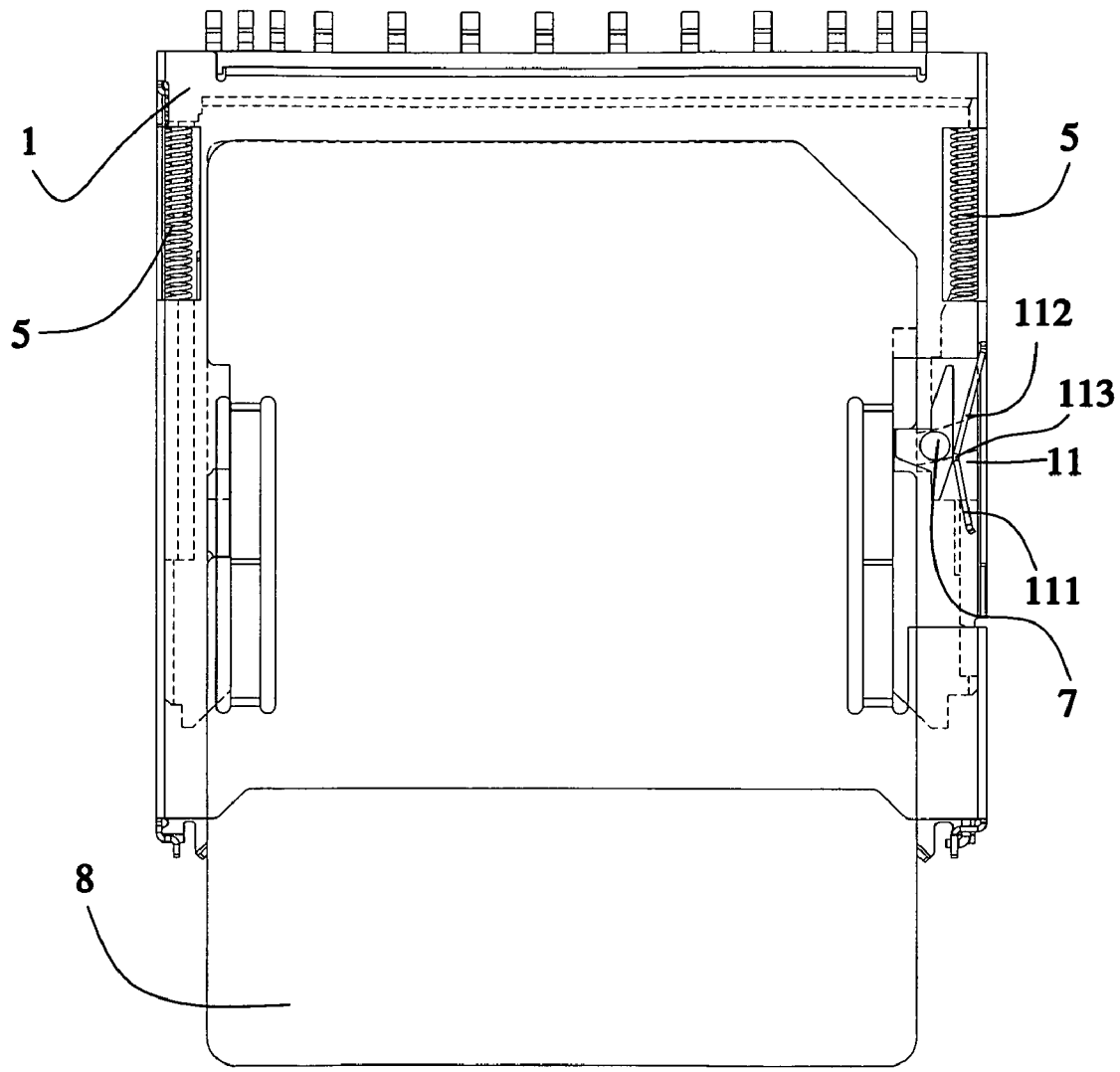
FIG. 8 is similar to FIG. 6, illustrating that the memory card is pushed into where the card is locked.

5. Referring to FIG. 8, while the card 8 is inserted, the slidable member 4 and the hooked member 7 are moved forward along with the card 8. While the card 8 is inserted to a locking position, where the tongue 11 is stopped against the hooked member 7 shifts, the second bottom side 741 of the second arm 74 is stopped against the front arm 111 and the bended portion 113 of the tongue 11, and the second lateral side 723 of the head portion 72 tightly contacts the end face 4111 of the opening 411 of the slidable member 4 and the locating recess of the card 8. Under the circumstances, the interaction force between the tongue 11 and the hooked member 7 reaches the maximum, so the head portion 72 is forced to move inward along the opening 411 up to the maximum degree and to be effectively engaged with the card 8.

Figure 9:
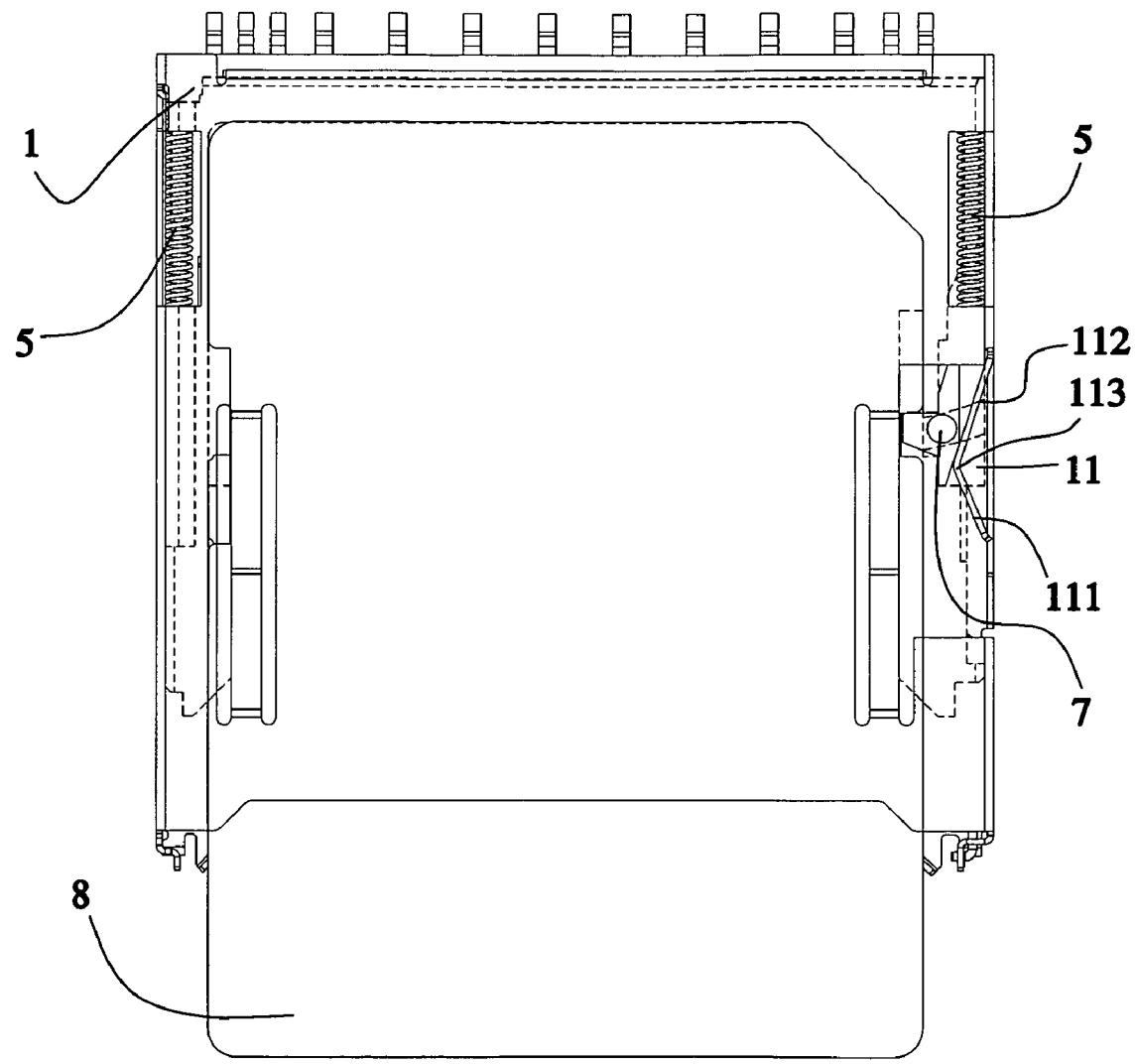
FIG. 9 is similar to FIG. 6, illustrating that the memory card is pushed into the rearmost end in the card connector.

6. Referring to FIG. 9, while the card 8 is pushed into the rearmost end in the card connector, the hooked member 7 is squeezed and stopped by the tongue 11 to move backward, and meanwhile, where the hooked member 7 is stopped against the tongue 11 is located at the rear arm 112 and the bottom side 731 of the first arm 73, such that the hooked member 7 can be effectively engaged with the memory card 8.

Figure 10:
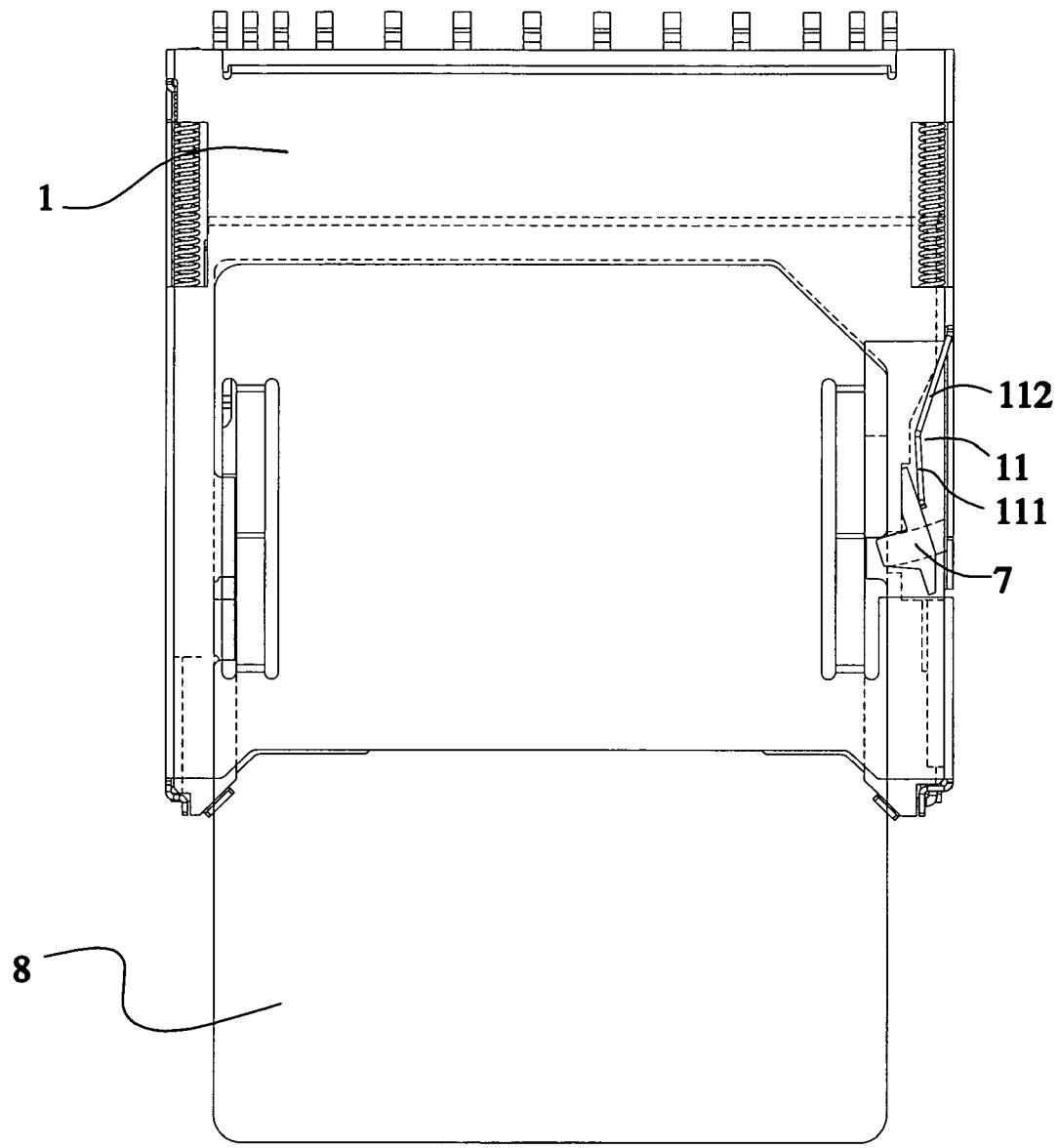
FIG. 10 is similar to FIG. 6, illustrating that the memory card is being ejected outward from the rearmost end in the card connector.

7. Referring to FIG. 10, while the card 8 is ejected from the rear end, a part of the hooked member 7 is still engaged with the card 8, effectively preventing the card from popping-out or falling-off.

Figure 11:
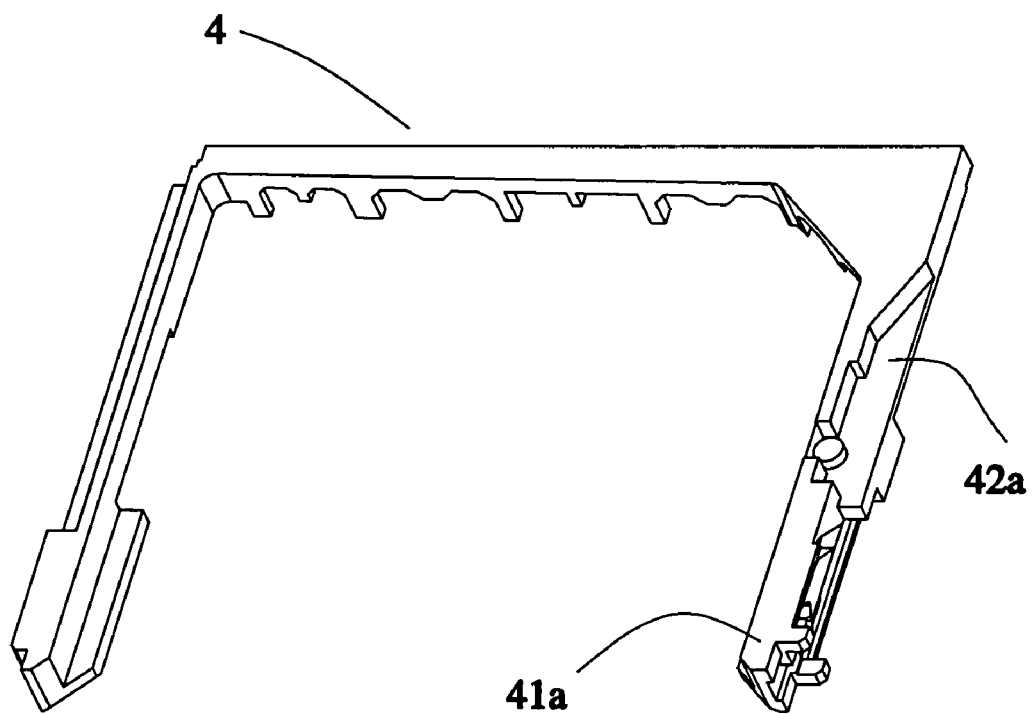
FIG. 11 is an exploded view of the slidable member in accordance with a second preferred embodiment of the present invention.
Figure 12:
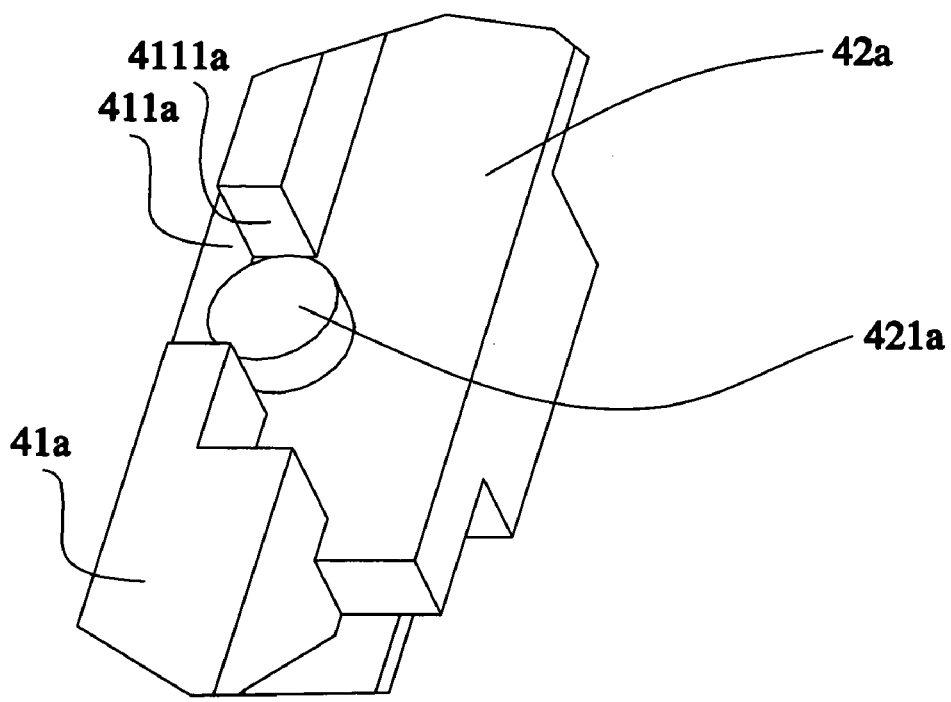
FIG. 12 is an enlarged view of a part B indicated in FIG. 11.
Figure 13:
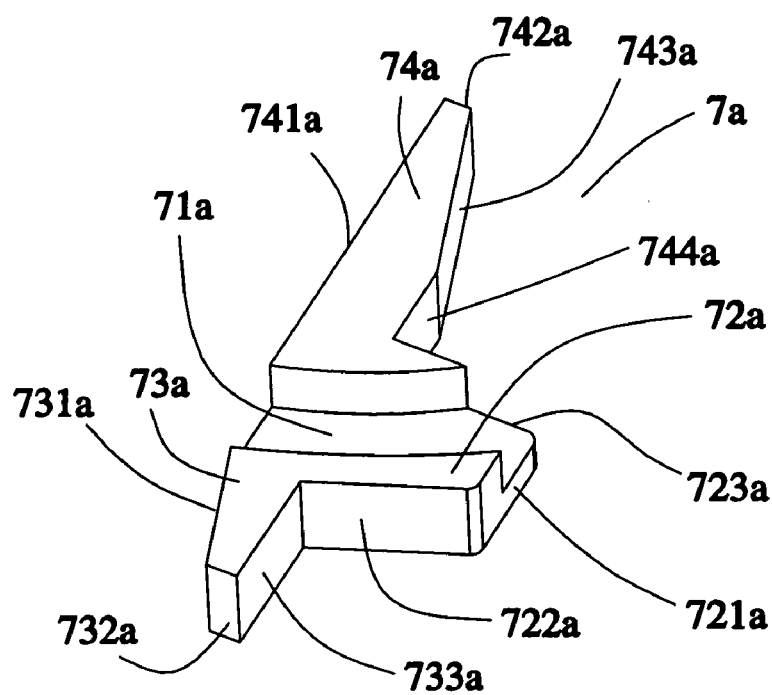
FIG. 13 is an enlarged view of the hooked member in accordance with the second preferred embodiment of the present invention.

Referring to FIGS. 11-13, a card connector constructed according to a second embodiment of the present invention is similar to the first embodiment, having difference as recited below. The relationship of coordination between the hooked member 7a and the recession 42a in the second embodiment is the same as that between the hooked member 7 and the recession 42 in the first embodiment. The recession 42a is provided on the sidewall 41a of the slidable member 4 and close to the external side thereof. The recession 42a has a convex portion 412a provided at the opening 411a and defined as the first matching portion. The end face 4111a for matching the hooked member 7a is provided at the opening 411a. The hooked member 7a, as shown in FIG. 13, includes the head portion 72a, the first arm 73a, the second arm 74a, and a groove 71a cut through the aforesaid three elements 72a, 73a, and 74a and defined as the second matching portion. The head portion 72a at the lateral fringe has the top 721a, the first lateral side 722a, and the second lateral side 723a. The first arm 73a at the lateral fringe has the first bottom side 731a, the first end face 732a, and the first shoulder portion 733a. The second arm 74a at the lateral fringe has the second bottom side 741a, the second end face 742a, the second shoulder portion 743a, and the third shoulder portion 744a. The hooked member 7a is mounted in the recession 42a, the groove 71a mounted on the convex portion 421a, being movable and rotatable with respect to the convex portion 421a via the groove 71a. The head portion 72a of the hooked member 7a can pass through the opening 411a to dip into the receiving chamber of the card connector for joint with the locating recess of a memory card located in the receiving chamber, thus locking the memory card in the receiving chamber.

In conclusion, the hooked member and the recession match the housing and the tongue, the tongue matching the recession and the hooked member very well, to securely lock the memory card in the card connector.

Although the present invention has been described with respect to specific preferred embodiments thereof, it is no way limited to the details of the illustrated structures but changes and modifications may be made within the scope of the appended claims.

What is claimed is:

1. A card connector comprising:
   a housing having a tongue provided on a side thereof;
   a base mounted in said housing;
   a plurality of terminals mounted in said housing;
   a slidable member mounted in said housing for reciprocating movement, said slidable member having a recession formed on a sidewall thereof corresponding to said tongue, and an opening cut through said sidewall and in communication with said recession, said recession having a first matching portion;
   a hooked member mounted in said recession and having a second matching portion for joint with said first matching portion of said recession; and
   a spring mounted in said housing;
   wherein said housing, said base, and said slidable member define a receiving chamber thereamong for receiving a memory card, said memory card having a locating recess at a side thereof, said base is located at a rear end of said receiving chamber, and said slidable member is movable for reciprocation within said receiving chamber, whereby while the memory card is pushed to drive said slidable member to move toward said base, said tongue forces said hooked member to act in said recession; while the memory card is inserted, said hooked member dips through said opening of said sidewall of said slidable member into said locating recess of the memory card located in said receiving chamber.

2. The card connector as defined in claim 1, wherein said first matching portion is a groove connected with said opening of said slidable member; said second matching portion is a convex portion facing downward and movably mounted in said groove.

3. The card connector as defined in claim 2, wherein said hooked member comprises a head portion, a first arm, and a second arm, said head portion facing said opening of said slidable member, said first arm extending toward the front end of said receiving chamber, said second arm extending toward the rear end of said receiving chamber, each of said first and second arms having a first bottom side facing a sidewall of said housing, said two first bottom sides being connected with each other; said tongue bends inward and comprises a rear arm extending toward the rear end of said receiving chamber, a front arm extending toward the rear end of said receiving chamber, and a bended portion located between said front and rear arms; and said first bottom side of said second arm is stopped against said front arm of said tongue.

4. The card connector as defined in claim 1, wherein said first matching portion is a convex portion abutting said opening of said slidable member; said second matching portion is a groove mounted onto said convex portion.

5. The card connector as defined in claim 4, wherein said hooked member comprises a head portion, a first arm, and a second arm, said head portion facing said opening of said slidable member, said first arm extending toward the front end of said receiving chamber, said second arm extending toward the rear end of said receiving chamber, each of said first and second arms having a first bottom side facing a sidewall of said housing, said two first bottom sides being connected with each other; said tongue bends inward and comprises a rear arm extending toward the rear end of said receiving chamber, a front arm extending toward the rear end of said receiving chamber, and a bended portion located between said front and rear arms; and said first bottom side of said second arm is stopped against said front arm of said tongue.

6. The card connector as defined in claim 3 or 5, wherein said head portion of said hooked member is wedge-shaped facing said opening of said slidable member and comprises a top facing said opening of said slidable member, a first lateral side connected between said top and said first arm, and a second lateral side connected between said top and said second arm.

7. The card connector as defined in claim 6, wherein said first arm of said hooked member further comprises a first end face connected with said first bottom side thereof, and a first should portion connected with said first end face, said first shoulder portion being connected with said first lateral side of said head portion of said hooked member; said second arm of said hooked member further comprises a second end face connected with said first bottom side thereof, a second shoulder portion connected with said second end face, and a third shoulder portion connected with said second shoulder portion and said second lateral side of said head portion.

8. The card connector as defined in claim 7, wherein said second lateral side of said head portion of said hooked member, an end face of said opening of said slidable member, and an end face of said locating recess of the memory card closely contact one another while the memory card is inserted into the card connector.

9. The card connector as defined in claim 7, wherein said first bottom side of said second arm of said hooked member is stopped against said bended portion of said tongue while the memory card is inserted into the card connector.

10. The card connector as defined in claim 2 or 4, wherein said convex portion is column-shaped.

* * * * *